INVENTOR.
HENRY W. BOTELER
BY David D. McKinney
ATTORNEY

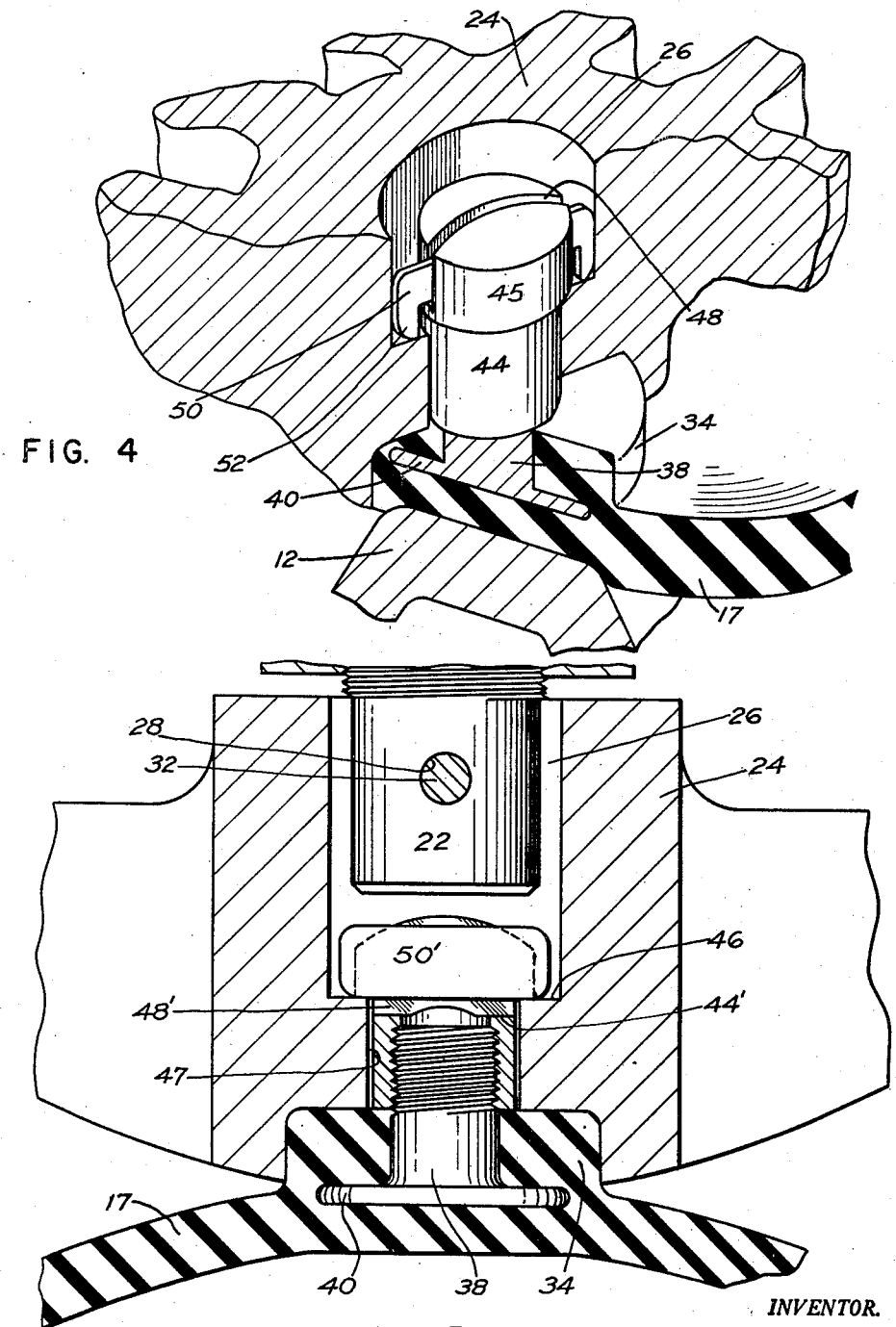

2,892,613

DIAPHRAGM VALVES

Henry W. Boteler, East Greenwich, R.I., assignor to Grinnell Corporation, Providence, R.I., a corporation of Delaware Application July 26, 1956, Serial No. 600,247

9 Claims. (Cl. 251—331)

This invention relates to diaphragm valves and more particularly has to do with improved arrangements for securing the diaphragm to the compressor in such valves.

In a diaphragm valve construction which has recently been proposed, involving a so-called lost motion connection between the compressor and diaphragm, the usual stud embedded in the diaphragm is moved directly by the compressor only when the compressor is moved away from the diaphragm seating. When the compressor is moved toward this seating, the compressor moves the stud by moving the diaphragm in which the stud is embedded, and when the compressor squeezes the diaphragm against the seating no appreciable force is exerted by the compressor directly on the stud. An advantage of this lost motion connection is that it prevents the stud from being punched through the diaphragm material between the stud and the seating when the compressor is forcing the diaphragm against this seating. Thus in the prior arrangements where the stud was rigidly connected to the compressor the layer of diaphragm material separating the embedded portion of the stud from the diaphragm seating surface was frequently pierced by this stud portion, particularly where this layer was less thick than the diaphragm itself or where the rigid connection between the stud and compressor held the diaphragm and compressor slightly apart from each other. By the provision of the lost motion feature no excessive squeezing force is ever exerted by the stud on the layer of diaphragm material thereunder and the stud cannot serve to hold apart the adjacent diaphragm and compressor surfaces in the region around the stud.

In the employment of this lost motion feature a compressor is often used which has on its side remote from the diaphragm an elliptically shaped recess or socket. This socket receives the cylindrical end of a spindle of the so-called "rising" type which is pivotally connected to the compressor by a pin extending along the minor axis of the ellipse, through the spindle, and with its ends journalled in the sides of the socket. The purpose of this pin, which is disposed at right angles to the seating, is to permit the compressor to rock slightly with respect to the spindle and seating and thereby to compensate for mis-alignments between compressor and seating due to small errors in manufacture and assembly.

A socket of elliptical shape is employed to prevent the sides of the socket from striking the spindle as the compressor rocks on the pin. Because this pin transmits the entire valve closing force the spindle must lie close to the sides of the socket where the pin ends are journalled in order to prevent bending of the pin. If the socket fitted the spindle this closely at all points or, in other words, if the socket were cylindrical rather than elliptical, no suitable rocking could take place.

In valves of this type the usual lost-motion connection is located within the elliptical socket below the spindle end, and comprises a tube nut having its head resting on the bottom of the socket around an aperture into which the hollow tube nut shank loosely extends for threaded connection with the diaphragm stud entering the aperture from the diaphragm adjacent side of the compressor. To replace a diaphragm in a valve of this type the bonnet is merely removed from the body, the old diaphragm rotated to unscrew its stud from the tube nut, and a new diaphragm rotated in place to thread its stud into the tube nut. While the diaphragms are being thus rotated it is necessary, of course, to prevent similar rotation of the tube nut, but it will be understood that the tube nut is effectively enclosed and concealed.

It has been known that the elliptical shape of the socket could be employed to prevent such rotation of the tube nut while the diaphragm stud is being threaded into or out of this tube nut, for example, by passing through the head of the tube nut a bar which extends along the major axis of the ellipse and is longer than the minor axis.

The difficulty with this arrangement has been that because the major axis of the ellipse need only be slightly greater than the minor axis in order to provide the required rocking about the pin as described rotating a diaphragm in order to tighten the stud in the tube would often cause the ends of such a bar to jam against the sides of the elliptical socket. Once jammed in this fashion the bar would be difficult to dislodge and if not dislodged the lost motion feature of the connection would have disappeared.

The present invention solves this problem by providing for the head of the tube nut a bar which prevents the tube nut from rotating when the ends of the bar engage the sides of an elliptical socket but which allows the tube nut to move axially of the socket and with respect to the bar if the bar jams against the sides of the socket.

Accordingly, it is one object of the present invention to provide an improved lost motion connection arrangement in which the connecting member engaged by the compressor to move the diaphragm in one direction away from its seating is provided with means preventing rotation of such member but permitting movement thereof in said one direction with respect to said means.

Another object is to provide, an improved lost motion connection arrangement including an ellipse-like compressor socket, a tube nut in said socket with a slot, and a key in the slot extending generally along the major axis of the socket.

Another object is to provide an improved arrangement of the kind described in which the bottom of the slot is substantially spaced from the key when both the tube nut and key are in their lowermost positions.

Another object is to provide an improved arrangement of the kind described in which the bottom of the slot is spaced from the key when the key is jammed at the bottom of the socket and when the diaphragm is being squeezed against its seating.

Another object is to provide an improved arrangement of the kind described in which the key is provided with short legs holding its center portion spaced from the bottom of the slot.

Another object is to provide an improved arrangement of the kind described in which the bottom of the socket is counter-sunk for the head of the tube nut and in which the bottom of the slot in the tube nut head lies substantially below the bottom of the socket when the tube nut head is in this countersinking.

Other objects will appear hereinafter.

The best mode in which it has been contemplated applying the principles of the present invention is shown in the accompanying drawings but the latter are to be deemed merely illustrative because it is intended that the patent shall cover by suitable expression in the appended claims whatever features of patentable novelty exist in the invention disclosed, In the drawings:

Figure 4 is a fragmentary view of the connection forming this invention with the valve in the closed position with the key member jammed; and Figure 5 is a detail view like Fig. 2 showing a modified form of the invention.

Figure 1:
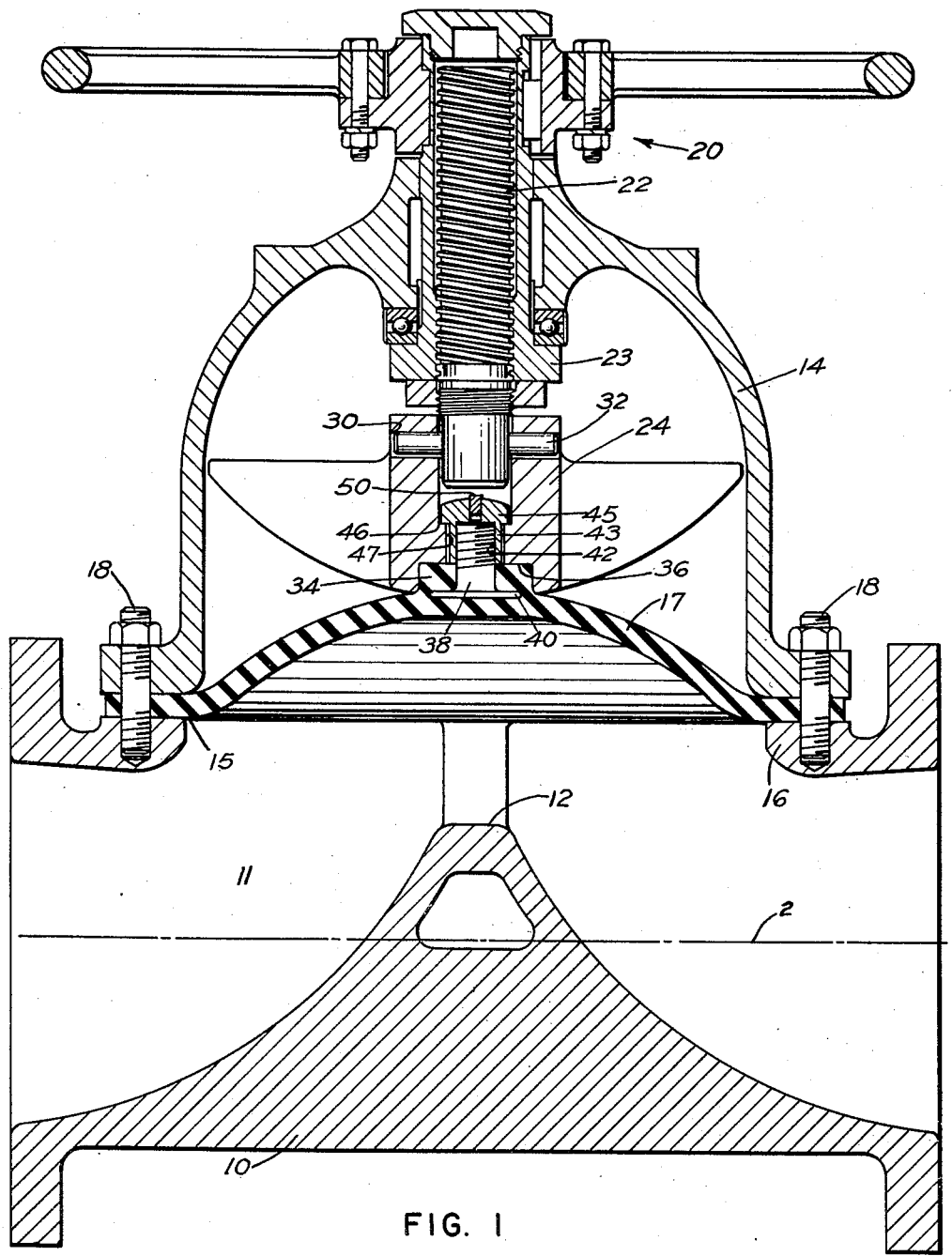
Figure 1 is a cross-section elevation view of a diaphragm valve embodying the invention, the valve being open, this view being taken along the longitudinal axis of the valve.
Figure 2:
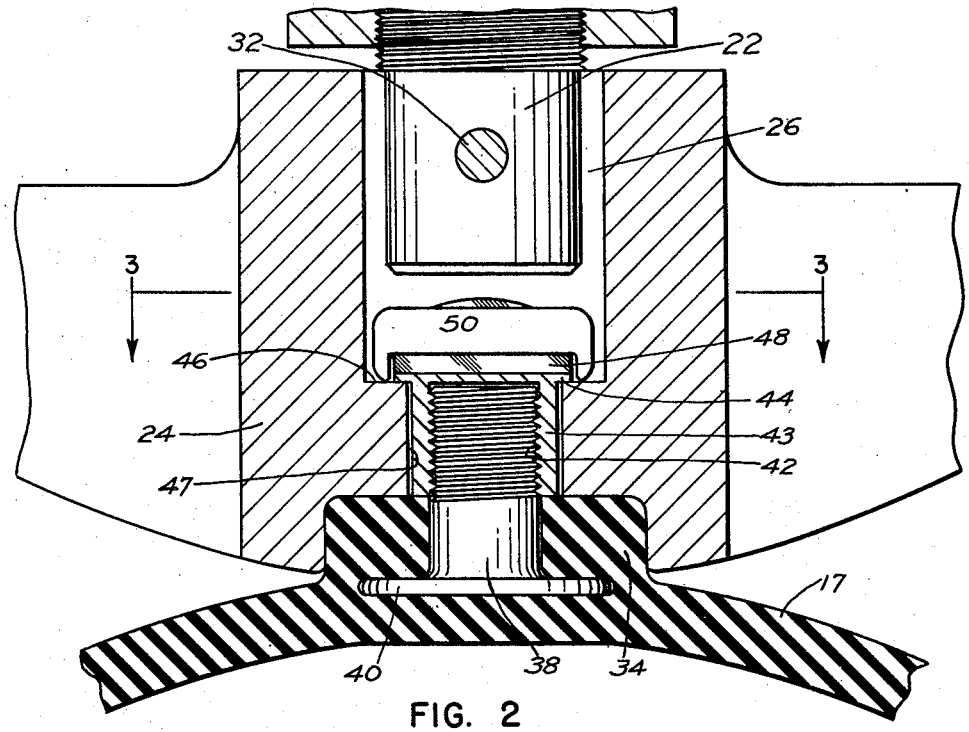
Figure 2 is a detail view at right angles to Fig. 1 showing the connection between the compressor and diaphragm which forms this invention.

Referring now to the drawings in which like numerals denote like parts, 10 designates the body of a diaphragm type valve having a longitudinal axis 2. This body is provided with a passage 11 having a transverse weir 12 thereacross. A bonnet 14 is secured to the body 10 around an opening 15 therein opposite this weir, and between the lower edge of the bonnet and a flange 16 around this opening a flexible diaphragm 17 is clamped by a plurality of bolts 18. An actuating mechanism 20 is situated in the upper portion of the bonnet 14, such mechanism including a spindle 22 the upper end of which is threaded in a bushing 23 and the lower end of which is secured to a compressor 24.

This compressor includes a socket 26 which is elliptical in cross-section (see Fig. 3) and which receives the lower end of the spindle 22, this lower spindle end being provided with a diametrical aperture 28. This aperture is aligned with opposed apertures 30 in the sides of the socket 26. A pin 32 passes through these various apertures and thereby secures the spindle to the compressor so as to allow the compressor to rock relative to the spindle about the minor axis of the ellipse. The diameter of the spindle end is only slightly smaller than the width of the socket along its minor axis so that there is very little opportunity for the pin to be bent when force is transmitted to the compressor by the spindle.

The flexible diaphragm is made of rubber, or rubber-like material, or one of the corrosion resistant plastics such as trichlorofluoroethylene or tetrafluoroethylene and has integrally formed thereon a boss 34. This boss fits into a recess 36 in the bottom of the compressor. A threaded stud 38 having its head 40 embedded in the boss 34 extends into the internally threaded bore 42 in the shank 43 of a tube nut 44. The height of the tube nut is such that the distance between the top of its head 45 and the lower end of the spindle is more than the movement of the bottom 46 of the socket away from the head 45 when the compressor squeezes the diaphragm against the weir to close the valve. Accordingly, the lower end of the spindle does not engage the top of the tube nut head when the valve is being closed. The tube nut shank 43 extends through an opening 47 in recess 36 which communicates with the socket bottom 46.

The top of the tube nut head is provided with a transverse slot 48 in which is fitted a key 50 having extending legs 52 which rest on the bottom of the socket 26 and support the key. The length of this key 50 is less than the major axis of the ellipse but greater than the minor axis and the depth of the slot 48 and length of legs 52 are such that there is clearance between the bottom of the slot and the lower edge of the key for a purpose which will now be described.

When it is desired to secure the diaphragm to the compressor (assuming that bolts 18 have been removed and the bonnet separated from the body), a diaphragm 17 is rotated clockwise causing the threaded stud 38 to rotate. Initially the tube nut 44 and key 50 will also rotate until the key assumes the position shown by the dashed lines 51 in Fig. 3. In this position the ends of the key will contact the sides of the socket 26 and further movement of the key and hence rotation of the tube nut is prevented. Then further clockwise rotation of the diaphragm screws the stud into the tube nut. If it is desired to replace a diaphragm, the threaded stud of the old diaphragm is screwed all the way out of the tube nut and the diaphragm separated from the compressor. In thus screwing the stud 38 out of the tube nut, the key will normally assume the other of the positions shown in the dashed lines 53 in Fig. 3 and the tube nut will again be held against rotation.

Figure 3:
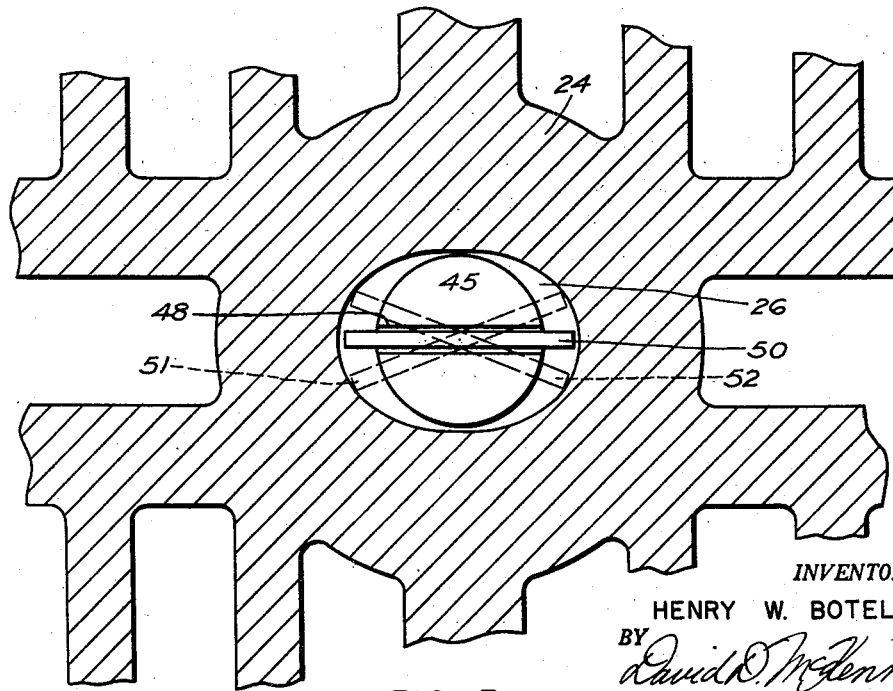
Figure 3 is a cross-sectional plan view taken along line 3—3 of Fig. 2.

When the threaded stud 38 is screwed into the tube nut and the diaphragm 17 is thus secured to the compressor 24, it is possible for the edges of the key to wedge or jam against the interior of the socket 26, as may be seen from the dotted lines of Fig. 3. This condition could occur even when the interior of the socket is smooth although, in practice, it is often rough because the compressor 24 is cast from a mold. If the key does become jammed and subsequently the compressor is moved downwardly to close the valve, initially this downward movement of the compressor will urge the diaphragm against the weir and after the diaphragm first contacts the weir continued downward movement to squeeze the diaphragm against the weir moves the key 50 (jammed against the compressor socket walls) down in the tube nut slot 48, this slot being deep enough to prevent the key reaching the bottom of the slot when the diaphragm is fully squeezed. Were there no clearance, the continued downward force would be transmitted from the compressor, through the jammed key, through the tube nut to the stud 38 and head 40. Such a condition would be undesirable since the diaphragm life is lengthened and a better seal between the diaphragm and weir is effected if the force of the compressor on the diaphragm is transmitted only through the bottom of recess 36 and not through the stud 38.

This jammed condition of the key when the valve is closed is shown in Fig. 4. The diaphragm 17 is shown bearing against the top of the weir 12, thus closing the valve. The key 50 is shown with its ends jammed or wedged against the interior of the elliptical socket 26. As seen in this figure, the diaphragm 17 has been squeezed against the weir by the compressor, and hence the compressor has moved downwardly with respect to the tube nut causing the tube nut to assume a higher position with respect to the socket 26. Since the key 50 was jammed or wedged prior to closing the valve as above noted, it could not move and hence the bottom of the slot 48 moved toward the bottom of the key 50 until the valve was fully closed. This may be seen by noting the slight clearance between the bottom of the key and the bottom of the slot. But in no manner has the key 50 exerted downward force on the tube nut, hence there is no force exerted upon the diaphragm by the head 40.

In Fig. 5 there is shown an embodiment of the invention wherein a tube nut 44' is provided with a slot 48' extending from the top of the tube nut to below the bottom 46 of the socket 26. A key 50' is located in the slot and rests directly on the socket bottom 46. The operation of this form of the invention is the same as that of the previously described form.

Although the sockets shown in the drawings have an elliptical cross section which is responsible for the jamming of the key, it will be obvious that other socket configurations might similarly be the cause of jamming of the key, for example, a diamond shaped or rectangular socket.

I claim:

1. For a diaphragm-type valve having a compressor with a socket therein and having connecting means with one portion in said socket overlying the rim of an aperture in the bottom thereof and with another portion extending slidably through said aperture and adapted to engage a diaphragm, a slot in said one connecting means portion, a key carried loosely in said slot, said socket having an ellipse-like cross section at said one connecting means portion, said key measured in a cross-sectional plane at said connecting means portion being shorter than the major axis of said ellipse-like cross section and being longer than the minor axis of said ellipse-like cross section, and at least the portion of said key which is within said slot being supported by said compressor in spaced relation with respect to the bottom of said slot.

2. For a diaphragm-type valve: a compressor having a socket; a tube nut with its shank extending loosely through said compressor and with its head engaging the bottom of said socket; a slot in said tube nut head; a key carried loosely in said slot, said socket having an ellipse-like cross section at said tube nut head, said key measured in a cross-sectional plane at said tube nut head being shorter than the major axis of said ellipse-like cross section and being longer than the minor axis of said ellipse-like cross section, and at least the portion of said key which is within said slot being supported in spaced relation with respect to the bottom of said slot.

3. A diaphragm-type valve comprising: a valve body having a passageway therethrough with an opening at one side thereof; a flexible diaphragm disposed across said opening; a bonnet clamping the diaphragm to the valve body; valve actuating means within said bonnet including a compressor having a socket therein of generally elliptical cross section; said socket having its minor axis substantially parallel to the longitudinal axis of said valve body; an aperture extending through said compressor from the bottom of said socket to said diaphragm; a tube nut having an annular flange within said socket overlying the rim of said aperture and having an internally threaded shank extending slidably through said aperture from said flange to said diaphragm, a stud having one portion embedded in said diaphragm and having another portion extending therefrom in threaded connection within said tube nut shank, a transverse slot in said tube nut, a key disposed within said socket loosely fitted in said slot, said key being shorter than the major axis of said socket and being longer than said minor axis, and said key being supported by said compressor in substantial spaced relation with respect to the bottom of said slot, whereby the bottom of the slot in the tube nut is free to move toward the key when the compressor is squeezing the diaphragm if the ends of the key are jammed against the elliptical side walls of the socket.

4. The device of claim 3 wherein the said transverse slot extends below the bottom of the socket, and wherein the ends of said key normally rest on the bottom of the socket.

5. The device of claim 3 wherein the key is provided at its ends with transversely extending legs the ends of which normally rest on the bottom of the said socket, and wherein the flange of the said tube nut normally rests on the bottom of the said socket.

6. For a diaphragm valve having a body with a passageway therethrough and an opening at one side of said passage and having a bonnet secured to said body around said opening, an assembly comprising; a compressor having on one side a socket of generally elliptical cross-section and having on the other side a flexible diaphragm; a connecting member securing said diaphragm to said compressor, said connecting member having one end thereof within said socket normally adjacent the bottom thereof; a transverse slot in said one end of the connecting member; a key in said transverse slot, said key being longer than the minor diameter of the ellipse and being disposed in the slot in spaced relation with respect to the bottom thereof.

7. A diaphragm-type valve comprising: a valve body having a substantially straight passageway therethrough and an opening at one side thereof; a flexible diaphragm disposed across said opening; a bonnet clamping the diaphragm to the valve body; actuating means for actuating the valve including a compressor within the bonnet; a socket of elliptical cross section on one side of the compressor, the minor axis of the socket being substantially parallel to the longitudinal axis of said valve body; said actuating means also including a spindle having its lower end pivotally secured within the said elliptical socket about said minor axis and having its upper end secured to said bonnet; an element connecting the said compressor to the said diaphragm; a transverse slot in the said element; a key having a length greater than the minor axis of the socket; said key being disposed in the slot and in said socket with clearance between the key and the bottom of the slot, whereby the said element is movable with respect to the key when the valve is closed.

8. For a diaphragm-type valve; a compressor with a socket therein, connecting means having a portion in said socket overlying the rim of an aperture in the bottom of said socket, a stop element carried by said connecting means portion, an abutment in the socket, said stop element being substantially nonrotatable with respect to said connecting means portion about the longitudinal axis of said aperture, said stop element being precluded from complete rotation relative to the socket by said abutment, and said connecting means portion being movable with respect to said stop element along said longitudinal axis.

9. For a diaphragm-type valve having a compressor with a socket therein and having connecting means with one portion in said socket overlying the rim of an aperture in the bottom thereof and with another portion extending loosely through said aperture adapted to engage a diaphragm, a stop element carried by said one connecting means portion, an abutment in the socket, said stop element being substantially non-rotatable with respect to said one connecting means portion about the longitudinal axis of the said another portion of the connecting means and being movable with respect to said connecting means portion along said longitudinal axis, said stop element being precluded from complete rotation relative to the socket by said abutment.

References Cited in the file of this patent

UNITED STATES PATENTS

| | | |
|---|---|---|
| 1,647,823 | Antisell | Nov. 1, 1927 |
| 2,096,528 | Saunders | Oct. 19, 1937 |
| 2,725,211 | Boteler | Nov. 29, 1955 |